Jan. 30, 1962 R. D. BLUE ETAL 3,019,279
DEPOLARIZED PRIMARY CELL
Filed March 20, 1958

INVENTORS.
Robert D. Blue
Norman P. Sweeny
Marshall P. Neipert
BY
C.W. Carlin
ATTORNEY

United States Patent Office 3,019,279
Patented Jan. 30, 1962

3,019,279
DEPOLARIZED PRIMARY CELL
Robert D. Blue, Midland, Mich., Norman P. Sweeny, Bloomington, Ind., and Marshall P. Neipert, Midland, Mich., assignors to The Dow Chemical Company, Midland, Mich., a corporation of Delaware
Filed Mar. 20, 1958, Ser. No. 722,746
9 Claims. (Cl. 136—103)

The invention is directed toward the production of electricity by means of a primary cell i.e., one which converts chemical energy into electrical energy. More especially it is directed toward such cell having an anode of a metal electropositive to carbon, e.g., magnesium, magnesium base-alloy, zinc or zinc-base alloy, and a cathode of porous carbon through which an aqueous electrolyte is passed containing depolarizing materials.

Cells for the production of electricity having two electrodes, one with a high positive or oxidizing potential, the anode, and one with a strong negative or reducing potential, the cathode, have long been known. The material most commonly employed as the anode is zinc, and that most commonly employed as the cathode is carbon, graphite, copper, or platinum.

The surface of the anode, e.g., zinc, oxidizes, i.e., undergoes a positive increase in valence (goes from zero to a higher value). As a result thereof, zinc atoms are converted to zinc ions which enter the electrolyte according to the equation:

$$Zn \longrightarrow Zn^{++} + 2e$$

As a result thereof, the anode is dissolved away. The electrons produced by the above reaction travel by way of an external circuit to the cathode and at the interface between the cathode and electrolyte react with the hydrogen ions which are drawn thereto through the electrolyte as a result of the lower positive potential thus set up. The reaction at the submerged surface of the cathode or at the interface between the cathode and the electrolyte is regarded essentially as a reduction of the hydrogen ions or of ions containing a hydrogen component such as $$OH_3^+ \text{ or } OH^-$$

to atomic and/or molecular hydrogen.

If a primary cell is to continue to provide useful electrical potential beyond a brief period of operation, the reactions mentioned above must be reversible to some extent. Unless there is such reversibility, an overvoltage develops which is a back electromotive force, i.e., a potential in the reverse direction to that initially present in the electrolytic system. Overvoltage is due to a condition developing in a cell which is referred to generally as polarization.

Polarization may be considered to be due either to depletion of the substances necessary for the occurring electrolytic process at a faster rate than they are being supplied or to the accumulation of the products of the electrolytic process at a rate faster than they are being removed. Polarization in its effect is similar to an ohmic resistance forming part of a circuit and is a condition which must be avoided or overcome to a large extent in primary cells. Among the proposed methods of overcoming the effects of polarization, known as depolarization, are mechanical agitation of the electrolyte, adjustment of current and voltage conditions, e.g., superimposing alternating current or intermittently attaching the electrodes to an outside electrical source to cause current to flow through the cell in the opposite direction, and employment of depolarizing agents known generally as depolarizers.

Depolarizers are usually classified as either oxidizing or reducing depolarizers. Oxidizing depolarizers are introduced at the cathode. Among oxidizing depolarizers are chlorine and oxygen which react with the hydrogen values tending to accumulate at the cathode. Reducing depolarizers are introduced at the anode. Among reducing depolarizers are acetylene and inorganic compounds yielding the lower of polyvalent cations such as ferrous, chromous, and vanadous ions.

For uses of electricity in areas not accessible to dynamo-produced electrical energy and which do not lend themselves to utilizing energy produced by gasoline or diesel-powered generators, there is a need for a primary electric cell. For a limited number of such uses the Leclanche cell has met this need. However, the electrolyte-depolarizer composition of the Lechanche cell renders the ratio of its weight and volume to the power and energy producible therefrom too high for use in compact and mobile cells. The methods heretofore proposed for overcoming the effects of polarization have not adequately overcome such effects and have not lent themselves to depolarizing compact and mobile primary cells having a relatively low ratio of cell weight to the kilowatts and kilowatt hours which the cell is capable of producing. There is, consequently, a need for more effective methods of depolarization, and for methods more adaptable for use in compact low-weight and mobile primary cells and for an improved primary cell containing such depolarizing means.

Therefore, the objects of the invention are to provide such method and improved cell.

A means by which depolarization is attained in a primary cell and a method employing such cell according to the invention will be made clear by the following description and the annexed drawing and are concisely defined by the appended claims.

The invention is an improved primary cell and method employing such cell for the production of electrical current consisting essentially of passing an aqueous electrolyte containing an alkali or alkaline earth bromide in solution, into which chlorine gas is admixed, through a porous carbon cathode and thence into contact with an anode of magnesium, magnesium-base alloy, zinc, or zinc-base alloy.

FIGURE 1 of the drawing is a schematic view of a sectional side elevation of the cell of the invention with the electrodes in a vertical position.

Figure 1:
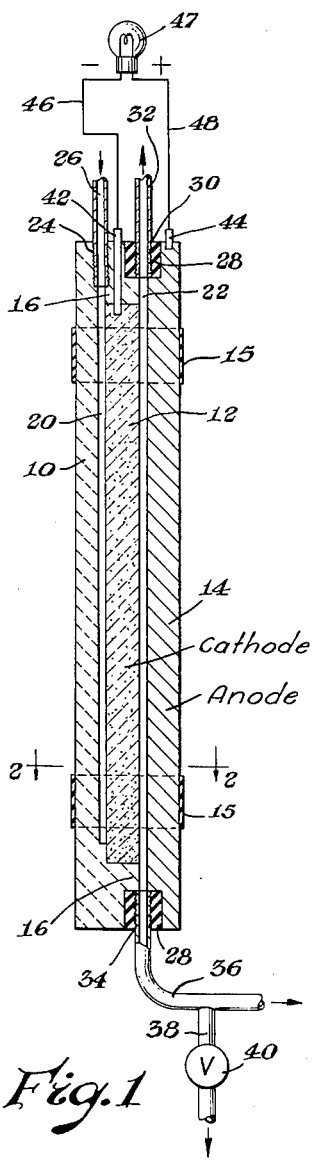
Figure 2:
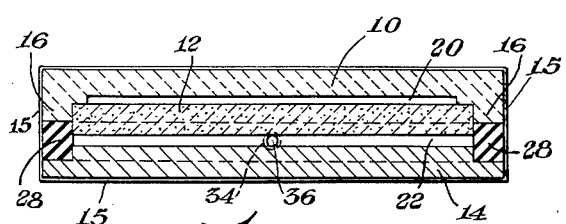
FIGURE 2 is a horizontal section taken along line 2—2 of FIGURE 1.

Referring to the drawing in more detail, and particularly to FIGURES 1 and 2, there is shown graphite slab 10, porous carbon plate 12, and magnesium-base alloy plate 14 in substantially vertical position held firmly together by electrically insulating clamps 15. Graphite slab 10 has inwardly extending projection 16, which together with graphite slab 10 and carbon plate 12, define narrow distributing chamber 20. Graphite slab 10 is substantially impervious to the passage of fluids whereas carbon plate 12 readily permits the passage of fluids therethrough. The opposite faces of plates 12 and 14, which are close together, define electrolytic chamber 22 and are the cathode and anode, respectively, of the electrolytic chamber. The distance between the opposing faces of slab 10 and plate 12 are on the order of 0.1 to 0.25 inch. The distance between the opposing faces of cathode 12 and anode 14 can be from 0.05 to 05 inch or more but usually does not exceed 0.125 inch in a new cell since close spacing of anode and cathode is preferable to minimize the internal resistance of the cell.

In an opening in the top of projection 16 of slab 10 is tapped recess 24 in which feed line 26 is threadedly engaged. Feed line 26 admits electrolyte from a source not shown to distributing chamber 20 under sufficient pressure to force the electrolyte through cathode 12 into chamber 22 and maintain chamber 22 completely filled during operation.

Electrically insulating gasket 28 forms a continuous seal all around the cell between projection 16 and anode 14 near the outer edges of the surfaces thereof which face each other and thereby entirely incloses chamber 22 except for tapped opening 30 in the gasket top, into which gas outlet line 32 (primarily for $H_2$ produced) is screwed, and tapped opening 34 in the bottom, into which electrolyte outlet line 36 is screwed. Gasket 28 is of any suitable resilient nonconducting inert material, e.g., Saran, a copolymer of vinyl chloride and vinylidene chloride. Outlet line 36 conducts electrolyte from the cell back to a chlorinating means, not shown, where chlorine gas is admixed with the electrolyte. Connected to line 36 is pipe 38, having valve 40 therein, to provide a means for bleeding off electrolyte from line 36 as desired.

Terminal 42 on cathode 12 and terminal 44 on anode 14, to which are attached lead lines 46 and 48 respectively, provide an external circuit for conducting the current produced by the cell to a work load represented by incandescent lamp 47, thereby providing a means for utilizing the electrical energy capable of being produced by the cell.

Figure 3:
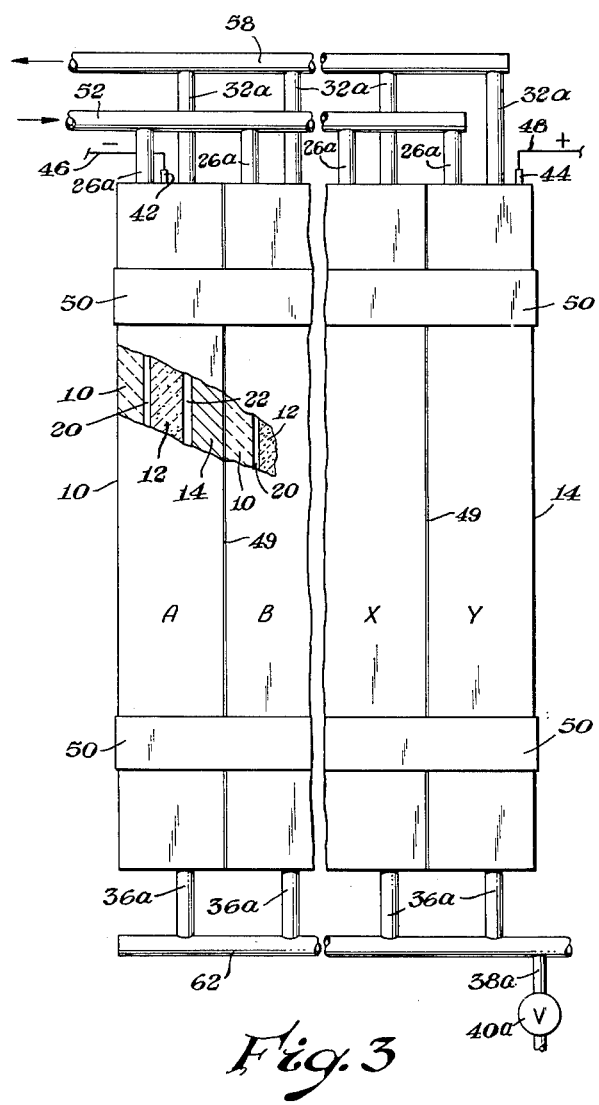
FIGURE 3 is a schematic side elevational view of a battery or multiple-cell unit of the invention.

Referring to FIGURE 3 of the drawing there is shown a multiple cell unit formed of a number of cells represented by A, B, X and Y of the type illustrated in FIGURES 1 and 2 abutting one another so that slab 10 of one cell is fayed with metal anode 14 of the adjacent cell. Conducting graphite cement 49 is used to form good electrical contact between the abutting electrodes. The so-positioned cells are firmly clamped together as by means of electrically insulating clamps 50. The cells are thereby electrically connected in series. Line 52 supplies electrolyte to feed lines 26a, each of which then carries the electrolyte to the distributing chamber of each of the cells as in the single cell of FIGURE 1. Gas outlet lines 32a lead from each of the cells into common line 58 which carries away the hydrogen or other gases produced. Electrolyte outlet lines 36a, each leading from the electrolytic chamber of a cell, empty into common discharge line 62. Line 34a, having valve 40a therein, serves as a means for bleeding electrolyte from line 62. Although slab 10 is shown of graphite, it may be of any rigid material so long as electrical contact is provided to cathode 12. The anode is preferably a magnesium-base alloy consisting of between 2 and 8 percent Al, 0.5 to 4 percent Zn, 0.1 to 0.4 percent Mn, and the balance Mg, but it may be Mg or Mg-base alloy containing at least 85 percent Mg or any Zn-base alloy or commercial grade zinc employed in the manufacture of zinc electrodes. The cell can be made to operate in any position between vertical and near horizontal, but it is preferred that it be substantially vertical.

In practicing the invention employing a cell of the type illustrated in FIGURE 1, a soluble bromide, such as a bromide of an alkali or alkaline earth metal, is dissolved in water or in an aqueous solution, e.g., ocean brine, to provide the electrolyte of the invention. Bromine may be employed in the electrolyte, instead of the bromide, in the presence of the suggested metallic ions. The concentration of the bromine component in the electrolyte should be at least about 8 grams/liter; it is preferred that it be between 16 and 24 grams/liter. Chlorine gas is pumped into the bromide-containing electrolyte. The pH of the electrolyte is preferably maintained below a value of 3. The chlorine gas is conveniently introduced by merely admitting it from a convenient pressurized container into the electrolyte line 26 preferably just before the electrolyte reaches the circulating pump (not shown). The chlorine is admitted in an amount sufficient to maintain a total oxidizing normality in the electrolyte of at least 0.1 N and preferably 0.6 N. It is thought that the dissolved chlorine gas replaces the bromine ions in the electrolyte to form chlorine ions and a species of bromine which is thought to comprise one or more of: dissolved liquid and/or gaseous bromine and reaction products between bromine and water such as oxygenated bromides, e.g. hypobromite or bromate.

The electrolyte containing the chloride and the dissolved bromine species is circulated through the cell, as by a pump, not shown, the electrolyte entering through line 26 into distributing chamber 20 and thence being forced through the pores of cathode 12 into electrolytic chamber 22 and therefrom to outlet line 36. It is preferable that a filter be employed in the feed line to remove suspended matter.

Hydrogen which is produced in the cell tends to accumulate at the cathode according to the reactions

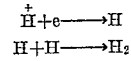

In the absence of a depolarizing agent, the thus-accumulating hydrogen would polarize the cathode. However, the dissolved bromine species, serving as the effective depolarizing agent, reacts with an appreciable percentage of the hydrogen. The reactions thought to take place at the cathode are

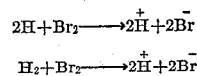

The hydrogen is removed from the cathode surface both by the above oxidation reaction and by the motion of the electrolyte in the direction of the anode.

At the anode the principal reaction is

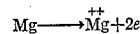

There are, however, secondary or parasitic reactions at the anode due to the presence of the hydrogen ions and a species of bromine whether it be in the ionic, atomic or molecular bromine form. These secondary reactions are thought to be:

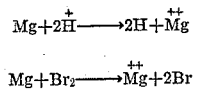

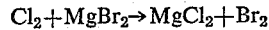

An appreciable amount of hydrogen is thereby also removed from the interface between the electrolyte and the anode and/or from the surface of the anode. The cell is thereby also depolarized at the anode as well as the cathode by the presence of the bromine species according to the invention. The electrolyte, passing out throught outlet 36, therefore, contains both $MgBr_2$ and $MgCl_2$ which are carried back to the chlorine gas-mixing means (not shown) where the electrolyte is brought in contact with additional chlorine gas; there the following reaction takes place:

$$Cl_2 + MgBr_2 \rightarrow MgCl_2 + Br_2$$

As the cell continues to operate, the percentage of magnesium chloride continues to build up. It has been found advisable to limit the percentage of the magnesium chloride to about 15 percent or a limit of 3.8 percent of the Mg component because percentages in excess of that amount tend to react to produce some magnesium oxychloride which adheres to some extent to the magnesium anode forming an electrically resistant layer which interferes with the current flow. The pH is maintained below a value of 3 by addition to the electrolyte of an inorganic acid, e.g., aqueous HCl or $H_2SO_4$, which forms substantially no precipitate. When the pH value rises above 3, oxychloride flocculant tends to form and lodge in the pores of the carbon cathode.

To maintain the Mg ion content as desired some brine is bled off through pipe 38 by opening valve 40, and fresh brine is conveniently admixed with the contents of electrolyte feed line 26 at a point not shown. Both fresh brine and chlorine gas can be conveniently admitted directly into feed line 26 at the pump or just prior to the electrolyte reaching the pump, the turbulence produced at the pump being sufficient to provide adequate mixing. It is necessary occasionally to add bromine or a bromide to the feed brine to make up for that bled off. NaBr is usually employed to bring the oxidizing normality up to at least 0.2 N.

The alkali or alkaline earth metal ions other than magnesium ions which have been introduced as the bromide in the start-up or make-up electrolyte employed, become largely depleted after the cell has been in use for a time, being gradually replaced by magnesium ions.

In practicing the invention employing a battery of the type shown in FIGURE 3, the procedure is little different from that employing one cell. The cells of the battery are placed in firm contact in electrical series. One method of attaining this is to employ a conducting cement between adjacent cells. A cement which can be employed for this purpose is one consisting of at least 50 percent battery-grade powdered graphite containing a bonding material; an example of such a cement is one consisting of 24 percent beeswax, 24 percent rosin, 2 percent gilsonite, and 50 percent of the graphite powder. The cells may also be firmly pressed together and sealed at the edges with a good bonding cement, e.g., Saran cement. Another way of making electrical contact is to employ copper plates as the contacting material between the cells, or to make connections between each of the cells by short copper wires or bus bars.

The following examples illustrate modes of practicing the invention:

EXAMPLE 1

A cell of the type shown in FIGURES 1 and 2, having an anode and a cathode with areas of 60 square inches each exposed to the electrolyte in the cell, was assembled. The anode was 0.5 inch thick. The cathode was porous carbon having a porosity of 60 as determined by the porosity scale of the National Carbon Company. Cathode 12 was made secure in projection 16 of graphite plate 10 by means of graphite cement. The anode was a magnesium-base alloy composed of 6.5 percent Al, one percent Zn, 0.2 percent Mn, and the balance Mg. The anode was spaced 3/16 of an inch away from the cathode. The electrolyte was an aqueous sodium chloride solution of about 3 percent NaCl concentration into which was admixed sufficient sodium bromide to give, after introduction of chlorine, an oxidizing normality to the electrolyte of 0.6 N as determined by known methods, e.g., by the indirect iodometric method.

The sodium chloride electrolyte was saturated with chlorine gas by releasing the gas from a conveniently located drum, into the electrolyte as it passed through line 26 at the pump (not shown). The pH of the electrolyte was maintained between 2 and 3 by addition of $H_2SO_4$. The flow of electrolyte was maintained between 300 and 600 cc. per minute through the cell.

Conducting wires were attached to the terminals of the cathode and anode. A rheostat was connected to one of the wires for controlling the current flow. An external circuit was then completed by connecting the wires to an ammeter, for measurement of current. A voltmeter was placed in parallel with the ammeter for measuring closed circuit voltage. Magnesium alloy wear was determined by gauging the thickness of the magnesum alloy anode and the magnesium consumed was determined by weighing the magnesium alloy anode before and after usage and subtracting to find the difference. The actual amperage produced was determined by a series of readings of the ammeter. The readings were averaged and the ampere hours computed from the average for the magnesium consumed. The theoretical amperage was calculated according to Faraday's law which shows the production of about 1000 ampere hours for each pound of magnesium consumed. The ampere efficiency was then calculated according to the mathematical expression:

$$\text{Ampere efficiency} = \frac{\text{Actual ampere hours produced}}{1000 \times \text{pounds of Mg consumed}}$$

It is assumed that a pound of magnesium is roughly equivalent to one pound of anode.

The cell voltage was taken about every hour by means of a voltmeter and the average voltage calculated by dividing the sum of the voltmeter readings by the number of readings. Table I below sets out the results obtained:

Table I

| | |
|---|---|
| Ampere efficiency _____ percent__ | 58 |
| Current density at anode _____ ampere/sq. in.__ | 0.87 |
| Total ampere hours _____ | 887.6 |
| Average cell voltage _____ | 2.0 |
| Weight of Mg-base alloy consumed _____ pounds__ | 1.53 |
| Magnesium alloy wear _____ inch__ | 0.41 |
| Oxidizing normality of electrolyte _____ | 0.5 to 0.6 N |

The open circuit voltage of the cell was 2.72 volts.

EXAMPLE 2

The cell employed in this example was a duplicate of that employed in Example 1. Operating conditions were also generally the same except that the current density was reduced to below 0.2 ampere per square inch by increasing the resistance by means of the rheostat. The results are set out in Table II:

Table II

| | |
|---|---|
| Ampere efficiency _____ percent__ | 43 |
| Current density at anode _____ ampere/sq. in.__ | 0.19 |
| Total ampere hours _____ | 1290 |
| Average cell voltage _____ volts__ | 2.27 |
| Weight of magnesium consumed _____ pounds__ | 3.0 |
| Magnesium-alloy wear _____ inch__ | 0.63 |
| Oxidizing normality of electrolyte _____ | 0.1 to 0.3 N |

EXAMPLE 3

A 200-ampere bipolar cell, similar to that shown schematically in FIGURE 1, except for area, was constructed. The dimensions of the anode plate were 23¼" x 23¼". There was a margin of 5/8", around the anode plate, which was covered by gasket 28, making the dimensions of that portion of the plate which was exposed to the electrolyte 22" x 22". The plate was composed of the same magnesium-base alloy employed in Examples 1 and 2. It was 5/8" thick and was spaced 1/8" from the porous carbon cathode at the start of the run. The cell was sealed by a cement comprising a copolymer of vinyl chloride and vinylidene chloride. The terminals were connected through an external circuit as in Examples 1 and 2. The brine contained from 10 to 14 percent $MgCl_2$ and 64 grams of NaBr per liter. These amounts provided an oxidizing normality of 0.6 N. Approximately one liter of brine per minute was passed through the cell which resulted in a current flow of about 200 amperes through the external circuit.

The cell was operated for about seven hours each day for seven consecutive days. While in operation, 100 amperes were usually drawn from the cell but for at least one hour each day, 200 amperes were drawn by adjustment of the rheostat. A summary of the results obtained are set out in Table III.

Table III

| | |
|---|---|
| Ampere efficiency _____ percent__ | 41.7 |
| Current density at anode ____ ampere/sq. in.__ | 0.206–.412 |
| Total ampere hours _____ | 6447 |
| Cell voltage _____ | 2.0–1.8 |
| Weight of magnesium consumed ___ pounds__ | 16.46 |
| Percent Mg alloy (anode) used ____ percent__ | 75.1 |

An examination of the cell in Example 3 after seven days run, showed it to be in very good condition. The porous carbon plate had not been attacked by any of the ingredients of the electrolyte; the magnesium alloy had been evenly worn to only about 1/16" thick over the exposed portion. A large portion of the remaining 24.9 percent anode weight was made up by the margin of the plate which was prevented from entering the action by gasket 28.

EXAMPLE 4

The multiple-cell unit shown schematically in FIGURE 3 of the drawing was constructed as follows: Five of the cells used in Example 3 were placed in firm contact so that the anode of one abutted against the cathode of an adjacent cell, leaving the anode of one end cell and the cathode of the other end cell as the terminals of the battery. The abutting cathodes and anodes were bonded together by means of the electrically conducting cement described hereinabove and clamped tightly by means of clamps 50.

The brine employed as the electrolyte in Example 3 with which chlorine gas was admixed was passed through the cells. The terminals of opposite polarity of each of the end cells were connected to a voltmeter and ammeter through parallel circuits in a conventional manner for obtaining closed circuit readings; the readings were made periodically. A battery of five cells connected in electrical series was thereby put in operation. The results of six runs are set out in Table IV:

Table IV

| Run | Amperes | Volts | Ampere Hours | Oxidizing N of Electrolyte | | pH |
|---|---|---|---|---|---|---|
| | | | | Feed | Effluent | |
| 1 | 114 | 8.90 | 220 | 0.40 | 0.16 | 1.9 |
| 2 | 90 | 8.75 | 526 | 0.41 | 0.22 | 1.8 |
| 3 | 83 | 8.51 | 389 | 0.34 | 0.17 | 2.2 |
| 4 | 96 | 8.60 | 265 | 0.36 | 0.12 | 1.3 |
| 5 | 88 | 7.90 | 165 | 1.20 | 0.11 | 2.4 |
| 6 | 100 | 10.60 | | 0.42 | 0.23 | 0.7 |

The $MgCl_2$ content of the effluent electrolyte was determined during runs 2 and 4 and found to be 10.1 percent at the time taken for run 2 and 8.59 percent at the time taken for run 4. Under a 100-ampere load, the average voltage produced per cell was 1.83 volts.

Experience with a similar multiple cell unit having copper bus bar connections between the cells instead of the graphite paste, shows that considerably higher efficiencies are thereby obtained, approaching those of the single cell shown in Example 1.

By extrapolating the results of Example 4 and assuming a current efficiency based on the magnesium alloy anode of 58 percent (obtained in Example 1), a 220-cell battery having an electrical potential of 400 volts (slightly over an average 1.8 volts per cell) capable of producing 500 amperes at a current density of .414 ampere per square inch and provided with anode plates of substantially the same material and thickness and spaced 1/8" from the cathode would require overall plate dimensions of 37" x 37" to give an active area exposed to the electrolyte of 1210 square inches.

When the cell of the invention is used in operating areas more or less remote from a servicing base or a maintenance unit, it is recommended that extra magtermined during runs 2 and 4 and found to be 10.1 percent the invention. To provide a continuous electrical source, two such 220-cell batteries are recommended. 7 sets of magnesium alloy plates will supply 50,000 kilowatt hours when used consecutively in two 220-cell batteries of the type being described only one of which is in use at one time. Two batteries are recommended so that service need not be interrupted when worn plates are being replaced.

The following summary shows the weight of each component or accessory and the ratio of this weight to the kilowatt hours produced by two 220-cell units of the invention used alternately. The calculations are based upon an ampere efficiency of 58 percent and upon the consumption of an average of 75 percent of the weight of each anode before replacement.

| Cell Component or Accessory | Weight in Pounds | Ratio of Weight in Pounds to Kilowatt Hours |
|---|---|---|
| 7 Sets of Mg Alloy Plates | 67,100 | 1.34 |
| $Cl_2$ and container | 161,000 | 3.22 |
| Make-up $Br_2$ and container | 37,000 | 0.70 |
| 2 Sets of Graphite and 2 sets of porous carbon plates | 34,000 | 0.70 |
| 2 Sets of Saran Inserts and gaskets | 1,240 | 0.02 |
| Piping, pump, etc | 1,500 | 0.03 |
| Acid and container for lowering pH | 500 | .01 |
| Totals | 302,740 | 6.06 |

In calculating the weights necessary to produce 50,000 kwh., an additional 6.4 percent was added thereto to provide for unanticipated loss, i.e., the weights were based on 53,200 kwh., but the weight ratios were based on an available output of 50,000 kwh. The ampere efficiency used in the calculations was 58 percent and the average percentage of the weight of each anode consumed before being replaced was 75 percent. To illustrate the method of calculating the weights necessary to produce 53,200 kwh., the weight of Mg plates for the consumable anodes is set out below:

$$\frac{53,200 \times 1,000}{100} = 133,000 \text{ ampere hours}$$

$$\frac{133,000}{1,000 \times .58 \text{ (efficiency)}}$$
$$= 229 \text{ pounds, the weight of Mg consumed}$$

$$\frac{229}{.75 \text{ (fraction of Mg anode used)}} = 305 \text{ pounds,}$$

the weight of Mg plates required for 1 cell $305 \times 220$ (No. of cells) = 67,100 pounds,
weight of Mg required in 7 sets A number of advantages inure to the practice of the invention, among which are: adequate voltage and energy output for a wide number of activities associated with advanced field or undeveloped-area operations. Due to the high solubility of chlorine in the bromide-containing brine (in contrast e.g., to the solubility of chlorine in the same brine but without the bromine component in an amount contemplated by the invention), the size of the chlorinating equipment is greatly reduced resulting in a low weight ratio of the equipment to the kilowatt hours produced. Due to the novel depolarization features, the cell operates at good efficiency until the magnesium-base alloy anode is substantially used up. The cell of the invention is generally adapted to mobile or floating units.

Having described the invention, what is claimed and desired to be protected by Letters Patent is:

1. A primary cell consisting of an anode composed of a metal selected from the class consisting of magnesium, magnesium-base alloys, zinc, and zinc-base alloys and electrically separated inwardly therefrom a porous carbon cathode defining an electrolytic chamber therebetween, said anode and cathode each having a broad face disposed opposite each other at a distance of between 0.05 and 0.5 inch; a distributing chamber exterior of said cathode at the top thereof; conduit means for admission of an electrolyte into said distributing chamber; an outlet at each end of said electrolytic chamber, and a pipe for conveying the electrolyte to a chlorinating means and back to said distributing chamber.

2. A primary cell consisting of an anode composed of a metal electropositive to carbon and electrically separated a distance of between 0.05 and 0.5 inch therefrom a porous carbon cathode defining an electrolytic chamber therebetween; an electrolyte comprising a brine containing chlorine and bromine components sufficient to maintain an oxidizing normality of at least 0.1 N and not over about 3.8 percent of a soluble magnesium component; a distributing chamber adjacent to the cathode outside the electrolytic chamber; conduit means for admission of electrolyte into said distributing chamber at the top thereof; an outlet at each end of said electrolytic chamber; and a pipe for conveying said electrolyte to a chlorinating means and back to said distributing chamber.

3. The cell of claim 2, wherein said metal electropositive to carbon is a magnesium-base alloy.

4. The cell of claim 3, wherein the magnesium-base alloy is composed of about 6.5 percent aluminum, 1.0 percent zinc, 0.2 percent manganese, and the balance essentially magnesium.

5. The method of producing electricity comprising chlorinating a bromide-containing brine to give an oxidizing normality of at least 0.1 N, passing said brine thus chlorinated through a porous carbon plate into contact with a plate composed of a metal selected from the class consisting of magnesium, zinc, magnesium-base alloy, and zinc-base alloy which is connected to said carbon plate through an external solid conductor to produce thereby D.C., drawing off at least a portion of said brine from contact with said magnesium alloy plate, rechlorinating the brine and passing the rechlorinated brine back through said porous plate.

6. The method of producing electricity comprising admixing a soluble bromide in an aqueous solution to make a bromide-containing brine containing at least 8 grams of the bromine component per liter of electrolyte, chlorinating said bromide-containing brine to maintain an oxidizing normality of at least 0.1 N, passing said brine thus-chlorinated through a porous carbon plate into contact with a magnesium-base alloy plate which is connected to said carbon plate through an external circuit to produce thereby direct current, drawing off said brine from contact with said magnesium alloy plate, rechlorinating the drawn off brine, and recycling the rechlorinated brine through the porous plate.

7. The method of claim 6, wherein the soluble bromide selected from the class consisting of the bromides of alkali and alkaline earth metals in an amount sufficient to produce an oxidizing normality of between 0.2 and 0.6 N.

8. The method of claim 6, wherein sufficient chlorine is used to saturate the brine in chlorinating it.

9. The method of claim 4, wherein said anode is a magnesium-base alloy composed of about 6.5 percent aluminum, 1.0 percent zinc, 0.2 percent manganese, and the balance essentially magnesium.

References Cited in the file of this patent

UNITED STATES PATENTS

| | | |
|---|---|---|
| 357,646 | Upward et al. | Feb. 15, 1887 |
| 470,073 | Ortelli | Mar. 1, 1892 |
| 859,437 | Divine et al. | July 9, 1907 |
| 898,055 | MacMillan | Sept. 8, 1908 |
| 1,060,468 | Little | Apr. 29, 1913 |
| 1,119,024 | Little | Dec. 1, 1914 |
| 1,121,771 | Sokal | Dec. 22, 1914 |
| 1,258,266 | Sokal | Mar. 5, 1918 |
| 2,207,734 | Heise et al. | July 16, 1940 |
| 2,273,795 | Heise et al. | Feb. 17, 1942 |
| 2,612,532 | Heise et al. | Sept. 30, 1952 |

UNITED STATES PATENT OFFICE
CERTIFICATE OF CORRECTION

Patent No. 3,019,279                      January 30, 1962

Robert D. Blue et al.

It is hereby certified that error appears in the above numbered patent requiring correction and that the said Letters Patent should read as corrected below.

Column 2, line 15, for "Lechanche" read -- Leclanche --; line 68, for "05" read -- 0.5 --; column 4, line 45, for "Mg+Br$_2$ $\longrightarrow$ Mg+2Br" read -- Mg+Br$_2$ $\longrightarrow$ Mg+2Br --; column 7, line 66, for "termined during runs 2 and 4 and found to be 10.1 per-" read -- nesium alloy plates accompany the multiple cell unit of --.

Signed and sealed this 3rd day of July 1962.

(SEAL)

Attest:

ERNEST W. SWIDER
Attesting Officer

DAVID L. LADD
Commissioner of Patents